(12) United States Patent
Tomasik

(10) Patent No.: US 11,559,375 B2
(45) Date of Patent: Jan. 24, 2023

(54) DIAMOND DENTAL TEETH FORMED BY USING LASER ENERGY

(71) Applicant: Leszek Aleksander Tomasik, Mount Prospect, IL (US)

(72) Inventor: Leszek Aleksander Tomasik, Mount Prospect, IL (US)

( * ) Notice: Subject to any disclaimer, the term of this patent is extended or adjusted under 35 U.S.C. 154(b) by 193 days.

(21) Appl. No.: 16/931,253

(22) Filed: Jul. 16, 2020

(65) Prior Publication Data

US 2022/0015873 A1    Jan. 20, 2022

(51) Int. Cl.
| A61C 8/00 | (2006.01) |
| A61C 1/00 | (2006.01) |
| A61C 13/08 | (2006.01) |
| C30B 29/04 | (2006.01) |
| A61C 3/02 | (2006.01) |

(52) U.S. Cl.
CPC .......... *A61C 8/0012* (2013.01); *A61C 1/0046* (2013.01); *A61C 3/02* (2013.01); *A61C 13/082* (2013.01); *C30B 29/04* (2013.01); *A61C 2201/00* (2013.01)

(58) Field of Classification Search
CPC ... A61C 8/0012; A61C 8/0068; A61C 1/0046; A61C 3/02; A61C 13/082; A61C 13/0003; A61C 2201/00; C30B 29/04; C30B 33/06
USPC ......................................................... 433/173
See application file for complete search history.

(56) References Cited

U.S. PATENT DOCUMENTS

| 3,826,003 A * | 7/1974 | Thenot ................. A44C 15/007 433/202.1 |
| 5,527,183 A * | 6/1996 | O'Brien ................. A61C 8/005 433/173 |
| 5,820,374 A * | 10/1998 | Simmons ............. A61C 8/0018 433/173 |
| 6,663,390 B2 | 12/2003 | Riley et al. |
| 7,176,406 B2 * | 2/2007 | Verschueren .......... B23K 26/38 219/121.73 |
| 10,183,337 B2 * | 1/2019 | Patten ................. B23K 26/0093 |
| 2003/0124491 A1 * | 7/2003 | Honkura ............. A61C 8/0069 433/173 |
| 2008/0057474 A1 * | 3/2008 | Zheng ................. A61C 8/0018 433/173 |
| 2009/0075236 A1 * | 3/2009 | Towse .................. A61C 8/0012 433/215 |
| 2010/0240010 A1 * | 9/2010 | Holmstrom .......... A61C 8/0025 433/173 |
| 2010/0303722 A1 * | 12/2010 | Jin .......................... A61L 27/18 623/23.72 |
| 2011/0183281 A1 * | 7/2011 | Jensen .................. A61L 27/306 427/2.27 |

(Continued)

*Primary Examiner* — Matthew M Nelson
(74) *Attorney, Agent, or Firm* — Ostrolenk Faber LLP

(57) ABSTRACT

A dental implant has an implant body made of diamond material, the implant body being provided with a bore hole that has at least one lateral dimension and a depth dimension, the lateral dimension and the depth dimension being mm sized. The bore hole is substantially formed by laser light being directed at the implant body to form said bore hole by softening said diamond material at an intended location of said bore hole. The bore hole is further defined by utilizing at least one metallic drilling tool to remove more of the diamond material after initial formation of the bore hole by said laser light. Preferably, the drilling tool has a cone shaped drilling head or a rectangular drilling head.

19 Claims, 7 Drawing Sheets

(56) References Cited

U.S. PATENT DOCUMENTS

| | | | |
|---|---|---|---|
| 2011/0262882 A1* | 10/2011 | Nordquist | A61C 8/0013 433/173 |
| 2012/0143334 A1* | 6/2012 | Boyce | A61C 8/0012 623/16.11 |
| 2013/0108879 A1* | 5/2013 | Mochizuki | A61C 5/73 433/172 |
| 2013/0137065 A1* | 5/2013 | Velamakanni | A61K 6/78 427/2.27 |
| 2013/0244208 A1* | 9/2013 | Rubbert | A61C 8/0036 433/175 |
| 2014/0080093 A1* | 3/2014 | Rubbert | A61C 8/0043 433/175 |
| 2014/0272794 A1* | 9/2014 | Legum | A61C 8/0013 427/2.26 |
| 2015/0230889 A1* | 8/2015 | Kim | A61C 8/0013 433/174 |
| 2016/0100916 A1* | 4/2016 | Jorneus | A61C 8/0018 433/173 |
| 2016/0331545 A1* | 11/2016 | Burkinshaw | A61F 2/4455 |
| 2018/0243803 A1* | 8/2018 | Jin | B08B 7/0071 |
| 2018/0250647 A1* | 9/2018 | Sundstrom | B29C 64/129 |
| 2018/0353219 A1* | 12/2018 | Beyar | A61B 17/8033 |
| 2018/0368988 A1* | 12/2018 | Duggal | A61B 17/1604 |
| 2021/0177333 A1* | 6/2021 | Scorsone | A61B 5/279 |
| 2022/0015873 A1* | 1/2022 | Tomasik | C30B 29/04 |

* cited by examiner

DIAMOND DENTAL TEETH FORMED BY USING LASER ENERGY

BACKGROUND OF THE INVENTION

The present invention is generally directed to dentistry and orthodontics and, more particularly, to a tooth product that is intended to serve as a substitute tooth, but which is imbued with ornamental and jewelry style aspects and characteristics. The product of the present invention can be loosely regarded to be a dental tooth implant or a dental crown, but with the caveat that it is fashioned from diamond material.

With reference to prior art FIG. 1, a conventional dental implant 1 comprises in large part three main components including an implant 2 which is implanted into the jaw bone of a person and becomes strongly fixed therein, a visible tooth component 4 that is attached to the anchor or implant 2 via an abutment or a mechanical coupling 3. The overall implantable tooth 1 is highly familiar in the art and widely utilized in the dental field to replace teeth that have been removed owing to tooth decay, sport and related injuries and other conditions.

As is widely known, the teeth of humans are subjected to large forces and stress that are applied in directions into the jaw bones and also laterally. Therefore, the strength of the anchor, i.e., the implant 2 has to be substantial in order to have any ability to remain in a person's mouth for many years, which is a basic requirement. The same is true of tooth substitutes that are anchored to tooth stubs that jut from the jaw bone which are covered by so-called "crowns."

U.S. Pat. No. 6,663,390 is directed to and describes a dental implant and tooth shaped ceramic crowns and provides a basic explication of the difficulties and the challenges that are encountered in properly implanting a replacement tooth. The contents of the U.S. Pat. No. 6,663,390 are incorporated by reference herein. Regardless, it is worthwhile to examine FIG. 1 of this patent which is presented herein as FIG. 2 with the reference numerals thereof altered for explication of the basic tooth replacement technology.

Thus, the implanted portion or the implant 2 is a solid member that has an outside serrated surface 12 which when set into the jaw bone results in bone tissue growing into the serrations and thus in a very strong connection to the jaw bone that will not budge during normal forces to which a substitute tooth 1 is subjected. The implant 2 has an interior void with internal threads 14 and therefore, is able to receive a shank 7 that is provided with its own threads 15 and thereby is capable of being solidly connected to and anchored within the implant 2.

It is the shaft 7 that is configured to fit within a large opening 10 in the visible portion, in the crown 4 of the tooth 1, the "crown" constituting the replacement tooth, all as is well-known in the field of dentistry. The supporting shank 7 has a longitudinal axis 7a that is aligned carefully with the shape and orientation of the opening 10 to provide maximum support for the tooth portion or the crown 4 as indicated. Of specific importance is the overall shape of the crown 4, which is made to emulate and to appear indistinguishable from the two neighboring teeth that are located to the right and to the left of the implanted tooth 1. The crown 4 has an outwardly visible surface 5 that can be seen directly facing the person and from the sides of the tooth and a rear shape 8 which are also intended to mimic the shape and feel of the natural lost tooth, in the depiction that tooth being a front facing incisor tooth.

One of the most important considerations in implanting a tooth is the material of which the crown 4 is constructed. In the prior art dating back several decades, implanted teeth or crowns were made from metal, sometimes silver or gold because they are very stable unreactive metals and also easier to shape and work with. Modern dentistry, however, has discovered new materials and specialty ceramics that are extremely hard and also provide an outside veneer and look that makes the replacement tooth indistinguishable from the neighboring natural teeth.

But there are individuals who have very special or unique and even to a certain degree, eccentric ideas about appearances, looks and jewelry and the dental field is familiar with the attaching by glue of diamond chips and the like to the outside surfaces of natural teeth or other types of teeth simply to satisfy whims, eccentricities, artistic or whimsical preferences of various creative or attention seeking individuals.

Particularly, people in show business, the movie industry or in the pop art world like to wear unique and attention grabbing clothes and to decorate themselves with jewelry and the like that are unique, differentiating and calls attention to themselves, sometimes going to extremes, e.g., body tattooing and piercing and the like.

Jewelry is a very important component in people's attire and overall look and there has developed a cadre of people to whom diamonds, including owing to their high expense, is very important to include in their wear and body decoration. They not only pin diamonds to their clothing, but also permanently attach them to various body parts, including to existing teeth, to make various fashion statements. One of the great desires of at least some people is to have teeth that are actually made of diamonds.

This was a challenge that has not been accomplished in the prior art owing to the very nature of diamonds. Diamonds are the hardest material known in nature. They are extremely difficult to shape and virtually impossible to bore large holes through a diamond to obtain an overall shape of the crown 4 depicted in FIG. 2. Nevertheless, there is a felt but unmet demand for implantable teeth made of diamonds that are capable of being attached to jaw bone implants or teeth stubs, as being done with existing ceramic and other synthesized materials currently being used for this propose.

The familiar diamond that is ubiquitously found in jewelry is a product that is obtained after a great deal of labor that is invested in deep mining to find so-called rough diamonds, i.e., kimberlite, and cutting, shaping and polishing operations needed to obtain the final diamond products used in jewelry.

FIG. 3 photographically depicts rough diamonds 20, including a first diamond 20a and a second diamond 20b. In accordance with known diamond processing techniques developed over the centuries, the rough diamond is analyzed and cut very carefully along certain orientations so that the overall diamond does not shatter along certain fault and/or stress lines. Then, the diamond is cut to its overall shape including to provide it with a large number of light reflecting flats, called facets, that are highly polished surfaces, as indicated by the round diamond 30 which has the facets 32. A typical round diamond has about 57 or 58 such facets and the unique sizes and relative orientations of the facets 32 result in the ultimate diamond having a unique sparkle and light dispersion and reflection/refraction pattern that characterizes and beautifies each specific diamond, and also imparting to it a great monetary value.

SUMMARY OF THE INVENTION

It is an object of the present invention to provide a tooth implant made of diamond that has a bore or cave into which a mostly implanted support shank inserted and fixed therein.

A dental implant according a preferred embodiment includes: an implant body made of diamond material, the implant body being provided with a bore hole that has at least one lateral dimension and a depth dimension, the lateral dimension and the depth dimension being mm sized; wherein said bore hole is substantially formed by laser light being directed at the implant body to form said bore hole by softening said diamond material at an intended location of said bore hole. The bore hole is further defined by utilizing at least one metallic drilling tool to remove more of the diamond material after initial formation of the bore hole by said laser light. Preferably, the drilling tool has a cone shaped drilling head or a rectangular drilling head.

Preferably, the bore hole is substantially cylindrically shaped with a single opening into the bore hole for the insertion of a support shank there into, with a diameter in the range of from about 1 to 6 mm. In another embodiment, the bore hole has a generally oval cross-section shape. The depth dimension of the bore hole is about 1 to 5 mm. The laser light is at a frequency of about 532 nm (nanometers), is delivered in a series of pulses and has an adjustable beam width. The laser light is delivered at a power level in the range of 7 to 20 watts.

Preferably, the dental implant includes a support shank affixed to the implant body by insertion into the bore hole. The shank is configured to be implantable into the gum bone of a human. The implant body has a facing surface and the facing surface has a plurality of light reflecting and refracting facets formed thereon. The facets are located to create on the facing surface a table facet surrounded by crown facets. The facing surface is configured to have an overall rectangular shape of a front human tooth.

In another embodiment, the laser light is at a frequency of about 1064 nm (nanometers).

Other features and advantages of the present invention will become apparent from the following description of the invention which refers to the accompanying drawings.

DETAILED DESCRIPTION OF PREFERRED EMBODIMENTS OF THE INVENTION

To a large extent, the present invention was born out of the discovery by the present inventor that the utilization of existing lasers made by the Bentonville company, specifically the MK6 Bentonville laser machines, provide an ability to form in diamonds millimeter sized openings, i.e., bores, caves, crevices and the like, which the use of diamonds in manners not previously in the prior art.

Figure 5A:
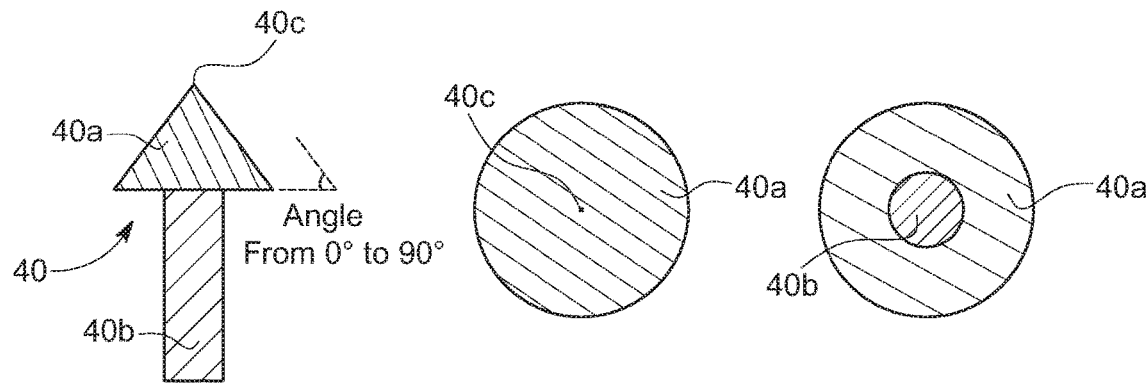
FIGS. 5a, 5b and 5c show in cross-section various tools utilized in accordance with the present invention to finish a millimeter sized opening in diamonds.
Figure 5B:
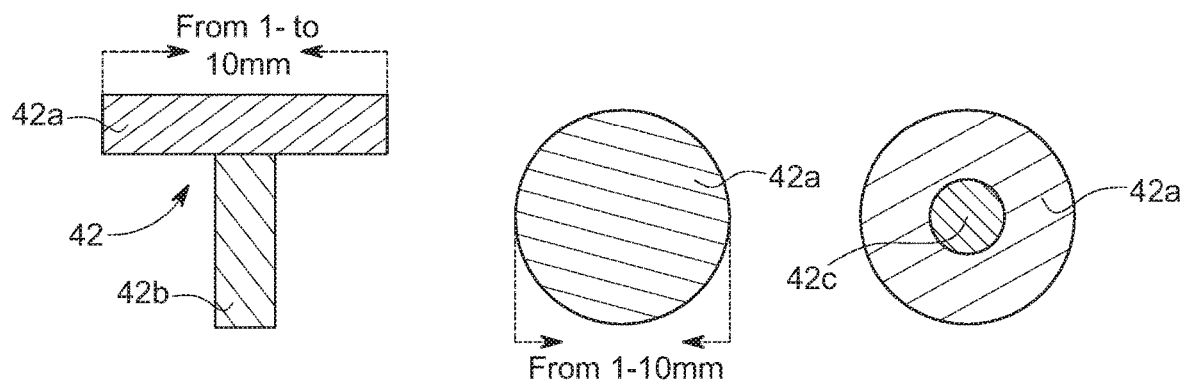
Figure 5C:
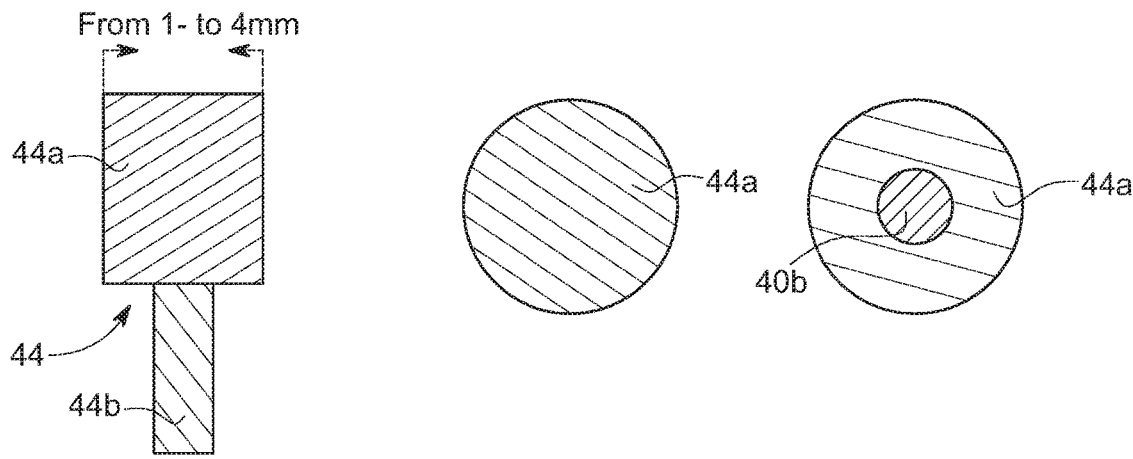

For the purposes of the present invention, the mentioned Bentonville MK6 lasers produce an initial, large sized opening which then needs to be finished by utilizing the drilling and shaping bits that are presented in FIGS. 5a-5c of the present specification.

Initially, reference is made to U.S. Pat. No. 10,183,337 which is directed to a laser augmented diamond drilling apparatus and method. In this patent, conventional diamond drilling tools are used, except that a thin through-going opening formed in the drilling bit is used to guide laser energy to the tip of the drill that heats and softens the diamond and allows easier and more efficient drilling of the diamond. The contents of the mentioned U.S. Pat. No. 10,183,337 are incorporated by reference herein.

Further reference is made to U.S. Pat. No. 7,176,406, the contents of which are incorporated by reference herein, which is directed to a device for cutting material by means of a laser beam. The patent mentions, at column 1, lines 20-25, that the laser beam can be controlled and utilized to cut a gemstone by forming straight cuts through the body of the gemstone. The specific laser is identified (at column 2, line 17) as being a YAG laser. It is known in the art to use low power, milli-watt level, laser pointers. However, lasers are also available that produce more than one watt in power, for example, green lasers for holographic purposes. But there are also lasers that produce one to twenty watts, from thirty to a hundred watts or even up to 3,000 watts of light energy, for example, lasers that utilize sealed carbon dioxide materials. As is known in the art, there are chemical lasers, excimer lasers, solid-state lasers, fiber lasers, photonic crystal lasers, semiconductor lasers and many other laser technologies. YAG lasers, namely Ytterbium Aluminum Garnet (YAG) lasers produce laser light that is coherent and focused in the 532 nm (green, visible) range and also beams at the 355 nm and 266 nm which are in the ultraviolet ranges. Ytterbium lasers also produce working frequencies around 1020 to 1050 nm and other similar lasers operate at a 2097 nm frequency bands.

The instant inventor understands that the aforementioned Bettonville MK6 lasers that the present inventor has discovered allowed him to drill large sized, i.e., millimeter sized, holes, caves, openings, etc., in diamonds is a diode pumped laser operating at 532 nm but also at 1064 nm. The average power is 12 or 20 Watts at 532 nm and 19 W at 1064 nm. To the present inventor's knowledge the formation of mm sized (one mm and larger) holes (caves) has not been achieved in the prior art. It seems no one even attempted forming such holes owing to concerns that such large sized openings would cause the diamond to shatter or lose its great strength and resistance to being shattered. But note that the 12 W power is actually in the range of 7 to 12 watts, depending on repetition rate, pulse width and other settings of the machine.

For the purposes of the present disclosure, when referring below to the Bentonville MK6 laser, the intention is to describe and refer to all lasers operating at the frequencies and output power levels that allow forming mm sized openings in diamonds, essentially entirely by the laser with the conventional drilling tools being used for hole finishing purposes.

Figure 1:
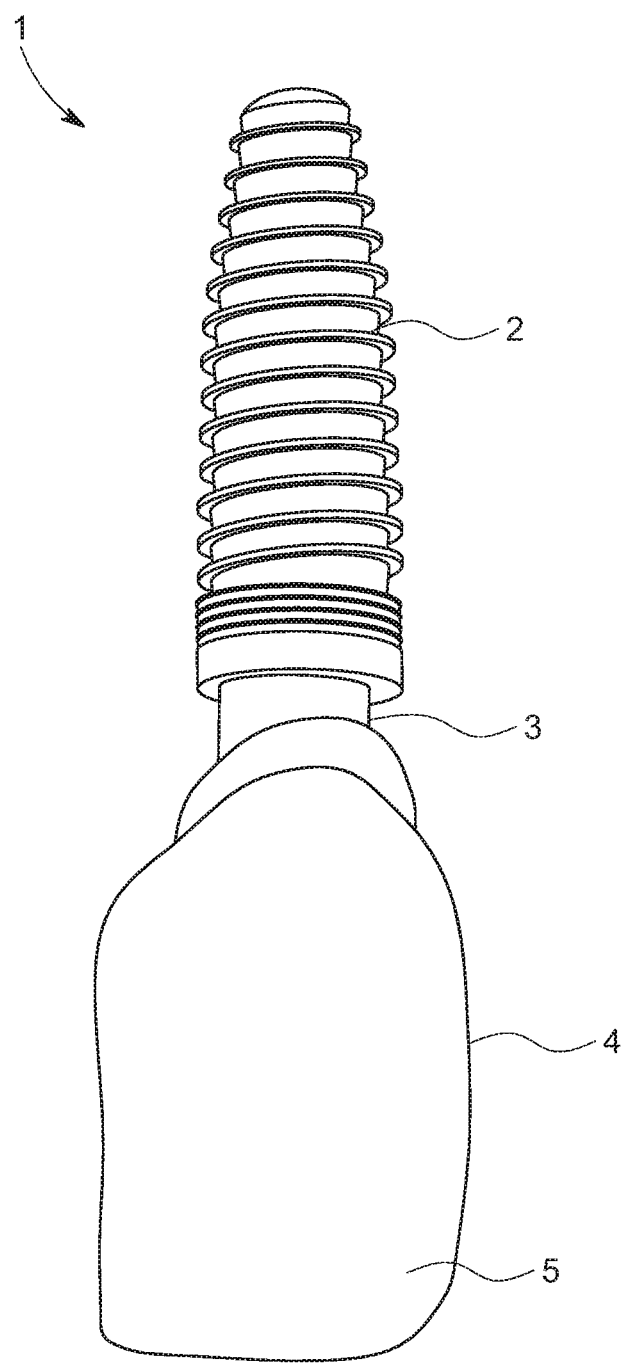
FIG. 1 is a prior art annotated photograph identifying the main components of and depicting a conventional dental implant.
Figure 3:
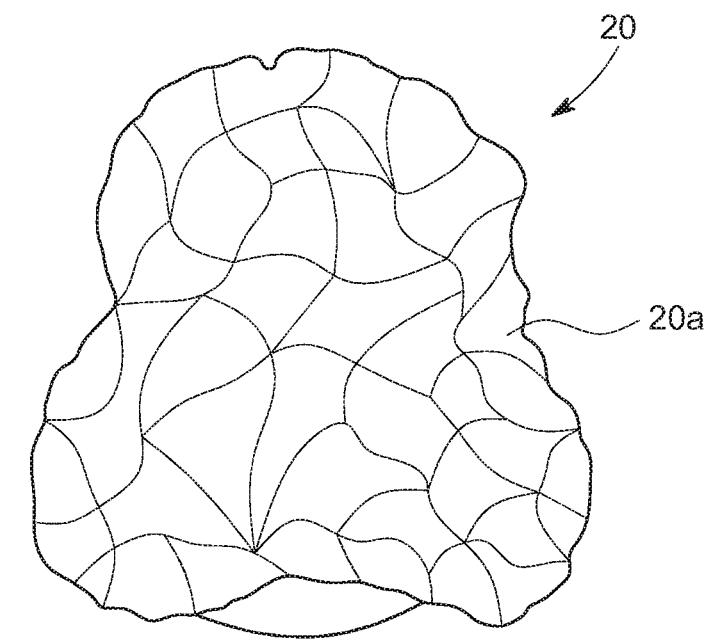
FIG. 3 shows photographs of kimberlite from which diamonds are made.
Figure 3:
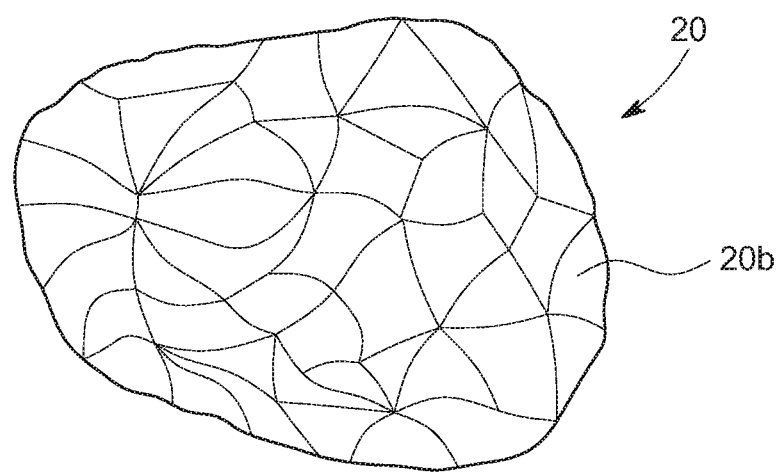
Figure 4:
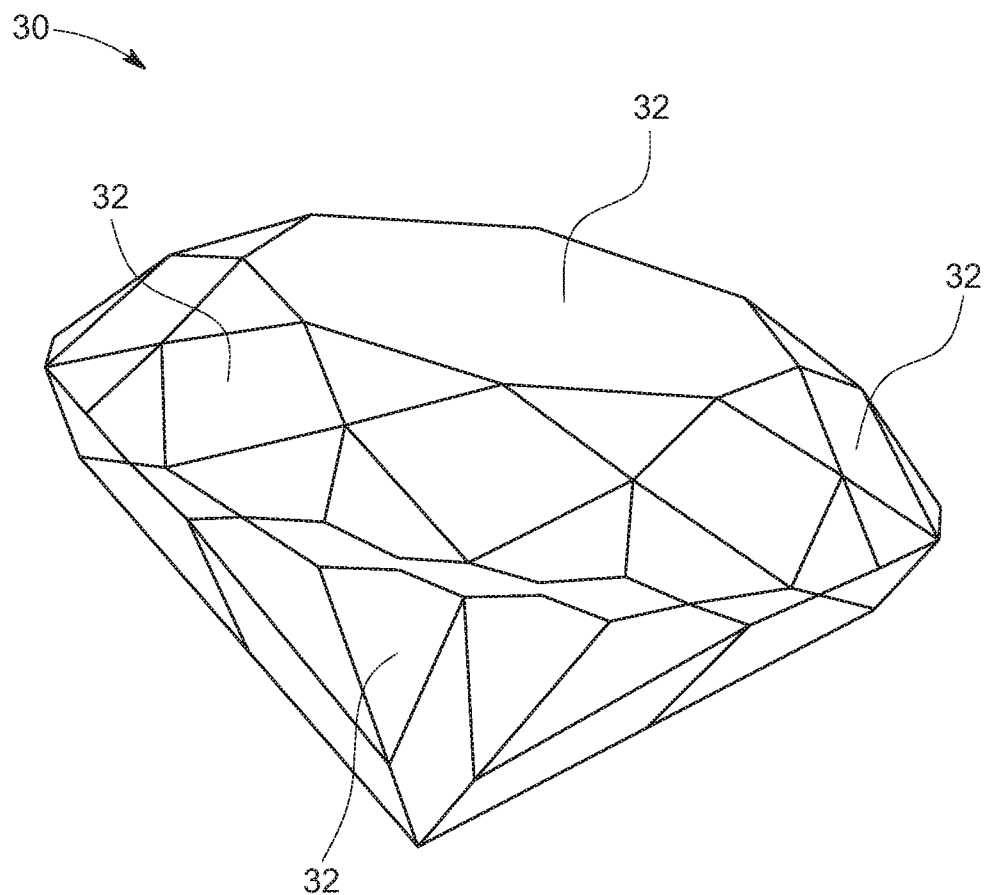
FIG. 4 shows a conventional round and so called full-cut diamond and its many facets.

Thus, to achieve and attain the objectives of the present invention, the method of the invention commences with the utilization of rough diamonds as shown, for example, in FIG. 3 herein and the splitting of these diamonds into initial blanks that will be ultimately utilized to form a dental implant, for example the dental crown 4 shown in FIG. 1, but made from diamond material. In general, as used herein the term dental implant refers to and includes any tooth like body that is intended to be permanently affixed to the jaw of a human to serve as a total or partial tooth replacement.

Figure 7:
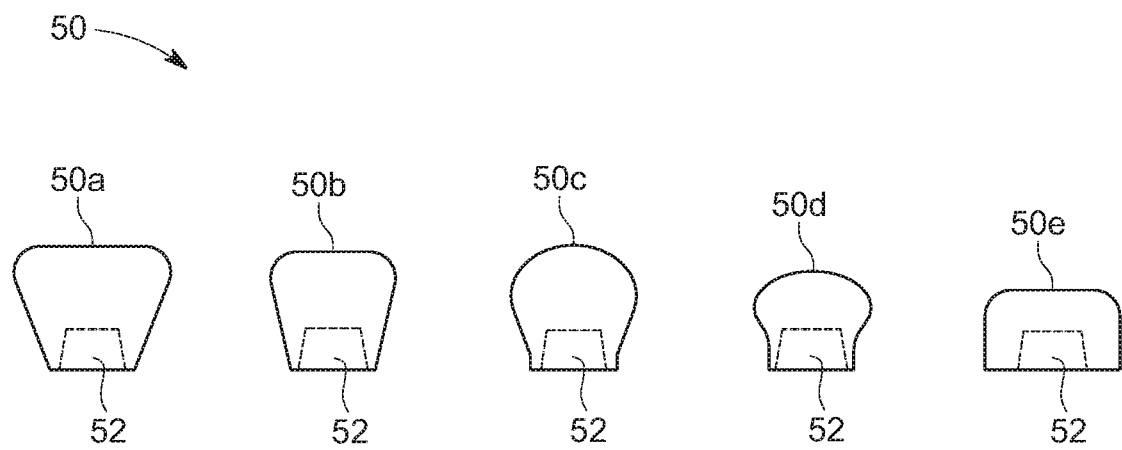
FIG. 7 shows various overall shapes of diamond dental implants or crowns in accordance with the present invention.

Thus, the rough diamond is cut and shaped to obtain the basic dental implant 4, imparting to it the tooth shape shown in FIG. 1 (but which may and can have other shapes as indicated in FIG. 7). But the key aspect of the present invention resides in being able to form therein with the laser light the large support opening 52 that has a depth axis that is aligned with the biting direction of a human, corresponding to the axis 7a in FIG. 2. The width of the opening in the horizontal direction in FIG. 7 is on the order of about 1-7 mm, preferably from 2 to 5 mm and the depth dimension (the height in the vertical direction in FIG. 7) is on the order of about 3-7 mm. Once the basic openings 52 shown in FIG. 7 are formed with the YAG laser light, the drilling tools shown in FIGS. 5a, 5b and 5c are utilized to finish or shape the interior surfaces of the openings 52.

Figure 2:
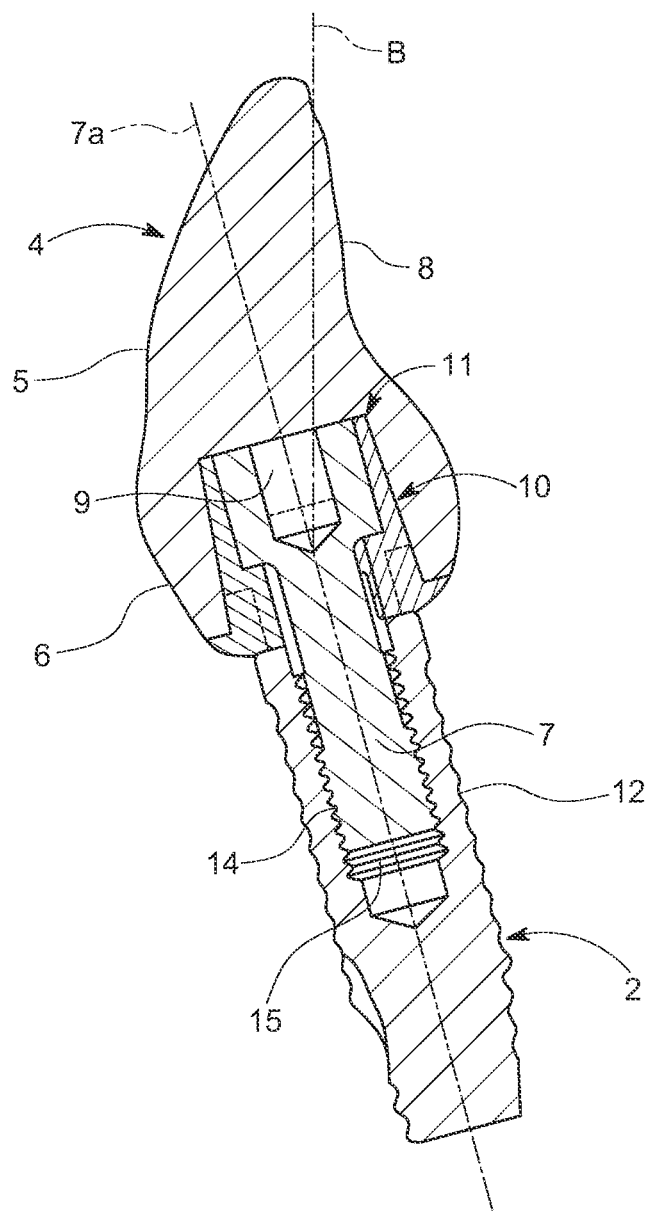
FIG. 2 is a prior art drawing showing more details about dental implants.

Thus, in FIG. 5a, the finishing tool 40 has a diamond grinding head 40a and a holding shaft 40b with a pointed end 40c. The views of the tool 40 also provide the top end view and he bottom end views. Note that this tool is round and that the openings are similarly rounded and the tool 40 will impart to the openings 52 a triangular cross sectional shape at the forward end. In addition, the tool can be used to score or roughen the interior surface of the opening, similar to the serrations that are shown in FIG. 2 being formed in the shank hole 12.

The finishing and drilling tool 42 in FIG. 5b has a drilling end 42a and a holding shaft 42b of the general shape and size that is indicated in the drawing. The foregoing remarks are equally applicable to FIG. 5c that shows the drilling tool 44 with the drilling end 44a and the holding shaft 44b.

Figure 6A:
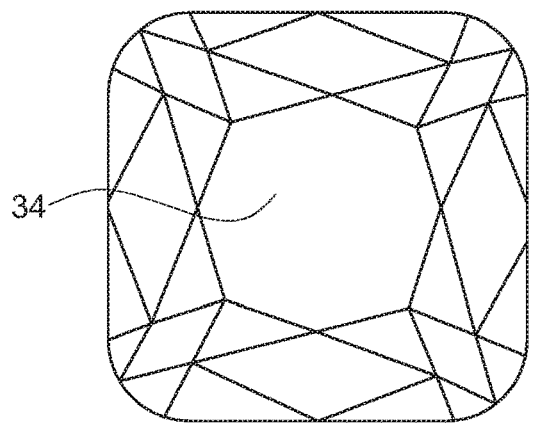
FIGS. 6a, 6b and 6c show the table and crown faceting that are provided in conventional diamonds and which can be utilized on a dental implant or crown of the present invention.
Figure 6B:
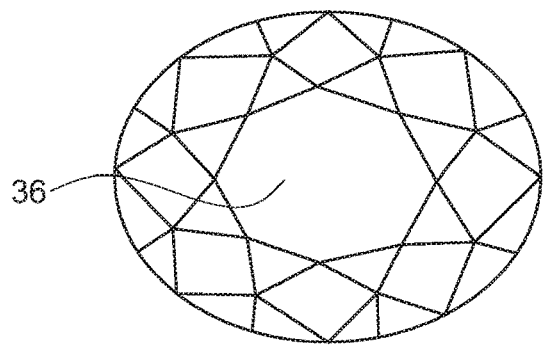
Figure 6C:
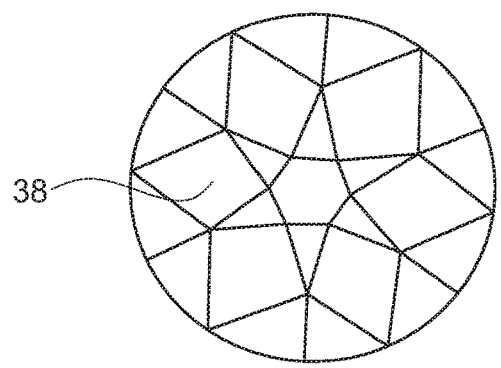

As noted above, diamonds glitter owing to the facets, flat surfaces, created on their outer walls. Conventional facets include the facts 34, 36 and 38 depicted in FIGS. 6a, 6b and 6c. The shown facets are located on the "table" and "crown" sections of the diamonds. For the purposes of the present invention, the outer surface of the implanted diamond tooth may be "diamond cut", in the manner that gold metal is "diamond cut" in jewelry. The process of diamond cutting results in numerous grooves and projections densely provided on the outer visible surface to the gold jewelry.

While the present invention has been described in relation to the utilization of the Bentonville MK6 laser for the purposes of forming the dental implants made of diamond described above, it will be apparent to one skilled in the art that the formation of the large millimeter size in a diamond can be utilized for other purposes as well. For example, the openings 52 may be utilized to provide a holding support via an anchor implanted in the diamond, the other end of which can be utilized as a grinding tool by finishing the opposed side of the diamond as a highly polished knife edge that can be used for drilling purposes and the like as would be apparent to one skilled in the art.

As widely known in the diamond art, the so called lab grown, man-made diamonds have made considerable inroads into the jewelry field and many jewelry pieces nowadays incorporate non-natural lab grown diamonds in jewelry. Similarly here, the present inventor's disclosures herein are equally applicable to and intended to be used to create dental implants made of lab grown, synthetic diamonds.

It is worth mentioning that the prior art is familiar with so called laser drilled diamonds. The laser drilled diamonds are however unique because they are used to only form micrometer sized pathways to the locations of the so called inclusions that are sometimes found in natural diamonds, which mar their appearances. By drilling the micrometer sized holes, it is possible to reach the inclusions and to evaporate the dark material (typically carbon) found therein and thereby (hopefully) improve the look, appearance and, most importantly, the monetary value of the given diamond.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A dental crown, comprising:
    an implant body made of diamond material, the implant body being provided with a bore hole that has at least one lateral dimension and a depth dimension, the lateral dimension and the depth dimension being mm sized; wherein
    said bore hole is substantially formed by laser light being directed at the implant body to form said bore hole by softening said diamond material at an intended location of said bore hole.

2. The dental crown of claim 1, wherein said bore hole is further defined by utilizing at least one metallic drilling tool to remove more of the diamond material after initial formation of the bore hole by said laser light.

3. The dental crown of claim 2, wherein the drilling tool has a cone shaped drilling head.

4. The dental crown of claim 2, wherein the drilling tool has a rectangular drilling head.

5. The dental crown of claim 1, wherein the bore hole substantially cylindrically shaped with a single opening into the bore hole for the insertion of a support shank thereinto.

6. The dental crown of claim 1, wherein the bore hole has a diameter in the range of from about 1 to 6 mm.

7. The dental crown of claim 1, wherein the bore hole has a generally oval cross-section shape.

8. The dental crown of claim 7, wherein the depth dimension of the bore hole is about 1 to 5 mm.

9. The dental crown of claim 1, wherein the laser light is at a frequency of about 532 nm (nanometers).

10. The dental crown of claim 9, wherein the laser light is delivered in a series of pulses.

11. The dental of claim 9, wherein the laser light has an adjustable beam width.

12. The dental crown of claim 9, wherein the laser light is delivered at a power level in the range of 7 to 20 watts.

13. The dental crown of claim 1, including a support shank affixed to the implant body by insertion into the bore hole.

14. The dental crown of claim 13, wherein the shank is configured to be implantable into the gum bone of a human.

15. The dental crown of claim 14, wherein the implant body has a facing surface and the facing surface has a plurality of light reflecting and refracting facets formed thereon.

16. The dental crown of claim 15, wherein the facets are located to create on the facing surface a table facet surrounded by crown facets.

17. The dental crown of claim 16, wherein the facing surface is configured to have an overall rectangular shape of a front human tooth.

18. The dental crown of claim 1, wherein the laser light is at a frequency of about 1064 rim (nanometers).

19. The dental crown of claim 1, wherein the diamond material comprises lab grown diamond material.

* * * * *